Figure 4:
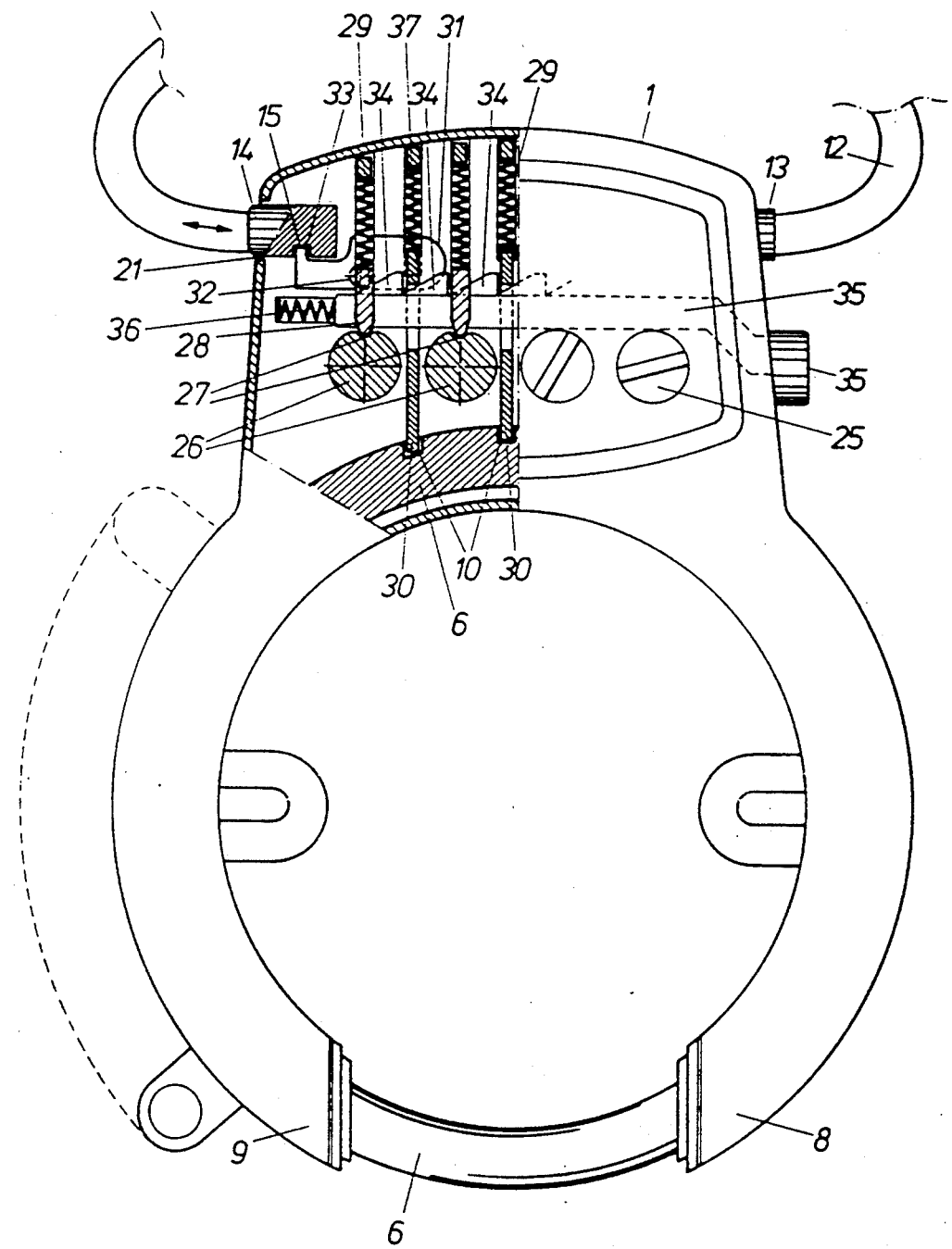

United States Patent [19]

Pedersen

[11] Patent Number: 5,197,310
[45] Date of Patent: Mar. 30, 1993

[54] LOCK FOR LOCKING A SPOKED WHEEL OF A BICYCLE

[75] Inventor: Poul D. Pedersen, Smorum, Denmark

[73] Assignee: Basta Lasefabrik A/S, Korsor, Denmark

[21] Appl. No.: 655,402

[22] PCT Filed: Aug. 17, 1989

[86] PCT No.: PCT/DK89/00196
§ 371 Date: Feb. 15, 1991
§ 102(e) Date: Feb. 15, 1991

[87] PCT Pub. No.: WO90/02074
PCT Pub. Date: Mar. 8, 1990

[30] Foreign Application Priority Data

Aug. 18, 1988 [DK] Denmark ............... 4652/88

[51] Int. Cl.$^5$ ............................................. B62H 5/00
[52] U.S. Cl. ............................. 70/227; 70/233; 70/49
[58] Field of Search ............. 70/227, 233, 225, 49, 70/30, 40, 48, 226

[56] References Cited

U.S. PATENT DOCUMENTS

| | | | |
|---|---|---|---|
| 3,965,709 | 6/1976 | Belke | 70/227 |
| 4,033,160 | 7/1977 | Mima | 70/227 |
| 4,571,965 | 2/1986 | LeRoux | 70/223 |

FOREIGN PATENT DOCUMENTS

| | | | |
|---|---|---|---|
| 52505 | 12/1936 | Denmark | 70/227 |
| 64741 | 8/1946 | Denmark | 70/227 |
| 3218305 | 11/1983 | Fed. Rep. of Germany | 70/233 |
| 1582951 | 1/1981 | United Kingdom | 70/49 |

*Primary Examiner*—Renee S. Luebke
*Assistant Examiner*—D. Boucher
*Attorney, Agent, or Firm*—Darby & Darby

[57] ABSTRACT

In order to improve the locking of a bicycle which is provided with a bicycle lock with a built-in cable- or chain-lock (12), a lock according to the invention is configured in such a manner that the cable-lock (12, 14) can be locked only providing that the locking ring (6) is locked, and vice versa. The lock hereby affords better protection, the reason being that when the lock according to the invention is used, then both the lock's normal locking ring (6) as well as the cable-lock (12) have to be broken open. This is achieved by preventing the locking pawl (4, 33) from entering into a locking engagement with the locking groove (15) in the locking piece (14) unless the locking pawl (4, 30) is engaged with the locking groove (10) in the locking ring (6), and vice versa.

3 Claims, 5 Drawing Sheets

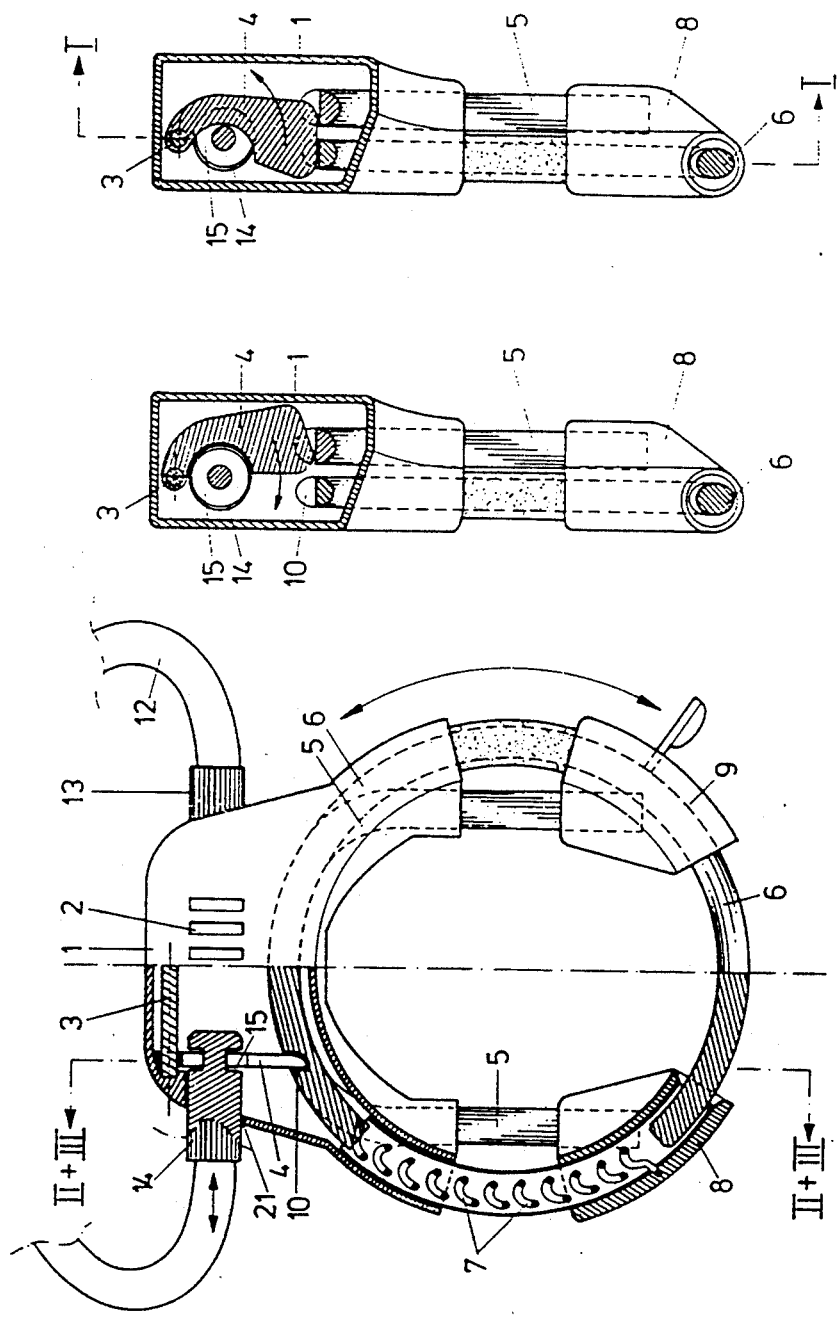

LOCK FOR LOCKING A SPOKED WHEEL OF A BICYCLE

The invention relates to a lock for the locking of a spoked wheel mounted in a fork on a bicycle, moped or a similar vehicle, said lock comprising partly a retaining part which can be attached at the one leg of the fork in which a blocking element in the form of a locking ring or locking arm is housed and is movable between a releasing position where the locking ring or the locking arm are free of engagement with the spoked wheel, and a blocking position, where the blocking element is in engagement with the spoked wheel and points towards an engaging part which can be secured at the other leg of the fork and in which engaging part the blocking element can be secured by means of first locking elements, and partly a locking track in the form of an aperture in which a locking piece can be introduced and secured by means of other locking elements, said locking piece being fastened to the free end of a cable or chain.

Locks of this kind, which are commonly known as bicycle locks, are used for the locking of a spoked wheel. In most cases, such locks are sufficient to prevent unauthorized removal of the bicycle.

However, there are situations in which the possibilities exist of breaking open such locks, which in practice means when there is time enough for this work to be carried out undisturbed.

In such cases, the known locks are not able to afford the necessary resistance against being broken open, the consequence being that these locks are often supplemented with so-called chain- or cable-locks.

These consist of a piece of chain or cable of a length, for example, of between 50 and 150 cm. The ends of the cable or chain can be locked together, either in an integrated lock housing or by means of a loose padlock.

This extra locking equipment enables the bicycle to be further secured, in that the cable or the chain can surround the spoked wheel as well as the frame and possibly also an external element such as a bicycle rack, a post or a lamp post.

Solely from the point of view of security, this solution is satisfactory, but it involves considerable inconvenience for the user. For example, the cable- or the chain-lock has to be taken along on the journey, which can be in an inconvenience since it takes up room in a bag, pocket, basket or carrier, and there is also the inconvenience of the extra key, which the lock requires, and which must similarly be taken care of.

Finally, this cable or chain-lock requires the use of both hands for its mounting and operation i.e. locking and unlocking. This is due to the fact that the cable or chainlock is difficult to manipulate because of its springy characteristics in relation to the bicycle, which therefore requires that the cable or chain-lock must be held firmly with the one hand while the locking parts are brought together and locked.

In order to avoid these inconveniences, it is known from U.S. Pat. No. 4,033,160 to incorporate a cable in a lock with a C-shaped locking member.

This lock with built-in cable-lock is an improvement in relation to the known lock combined with a loose cable-lock, but it is only of help with regard to the actual handling.

This lock is namely arranged in such a manner that the two locking systems can be used completely independently of each other, which can result in inadequate locking when only the cable lock is used. The cable-lock is a relatively inferior lock, and therefore a poorer lock than the actual bicycle lock with blocking member.

The object of the invention is to avoid the disadvantages of the known constructions, and this object is achieved with a lock of the initially described kind, the said lock according to the invention being characteristic in that the first locking elements are designed to be able to secure the locking ring or the locking arm only when the locking piece is secured by the other locking elements, and that the other locking elements are designed to be able to secure the locking piece only when the locking ring or the locking arm is secured by the first locking elements.

It becomes possible hereby to lock by a combination of the two locking arrangements by means of one and the same lock, and with the use of only one hand. In addition to the considerable operational advantages of this construction, considerable security lies in the fact that both locks must always be used in order thereby to provide a double locking of the bicycle.

It is precisely because of this blocking of the use of the cable-lock alone that the lock according to the invention affords a significant safeguard, the reason being that the cable- or the chain-lock must always be used at the same time as the fixed lock.

By allowing the locking elements to lock both the locking ring or the locking arm and the locking piece on the cable or the chain, one can suffice with a single locking element and thereby simplify the operation.

Also, it is expedient to use two pawl systems which can be disengaged simultaneously, in that the possibility is hereby provided of building up a compact and robust release construction.

Figure 5:
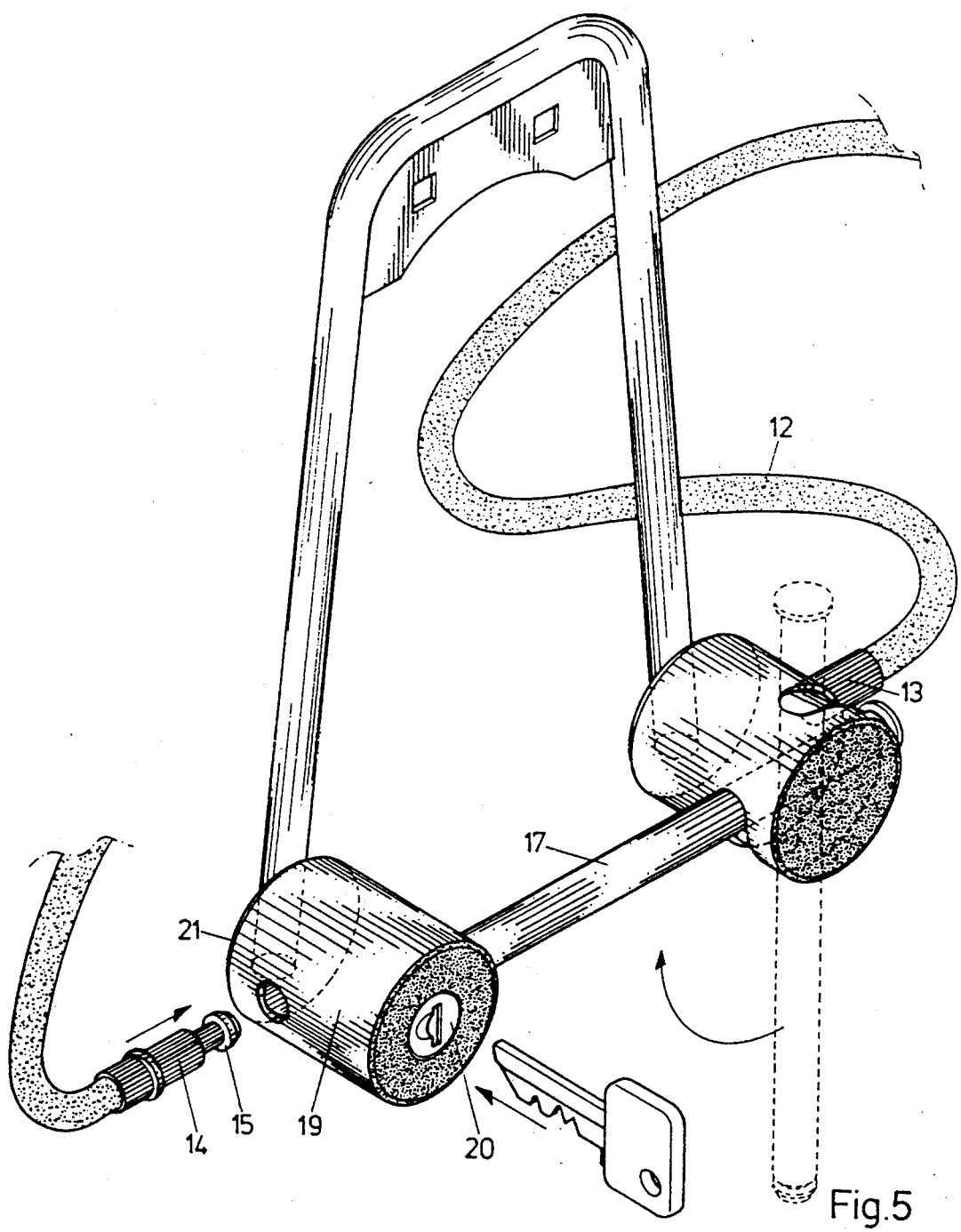
Figure 6:
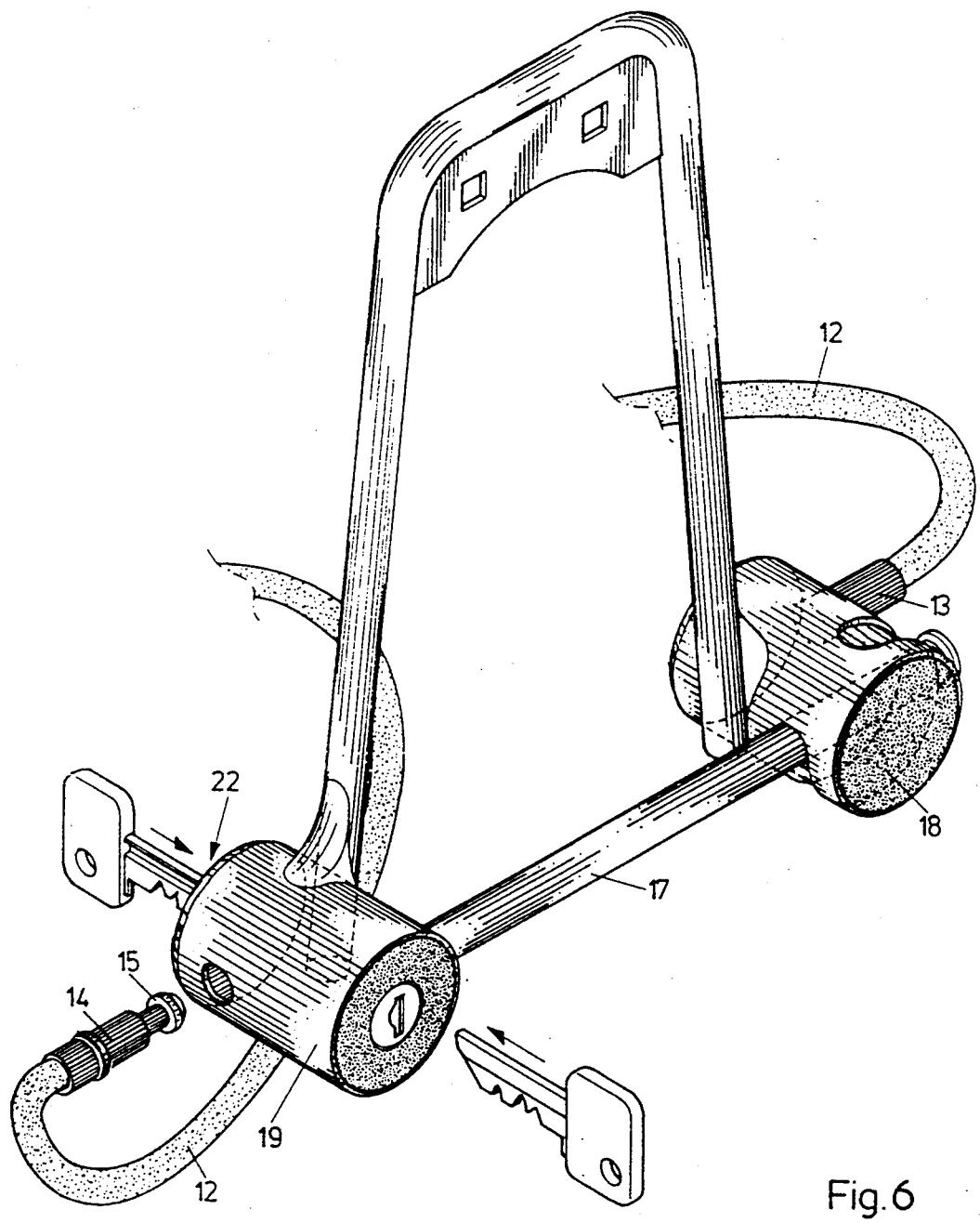
Figure 7:
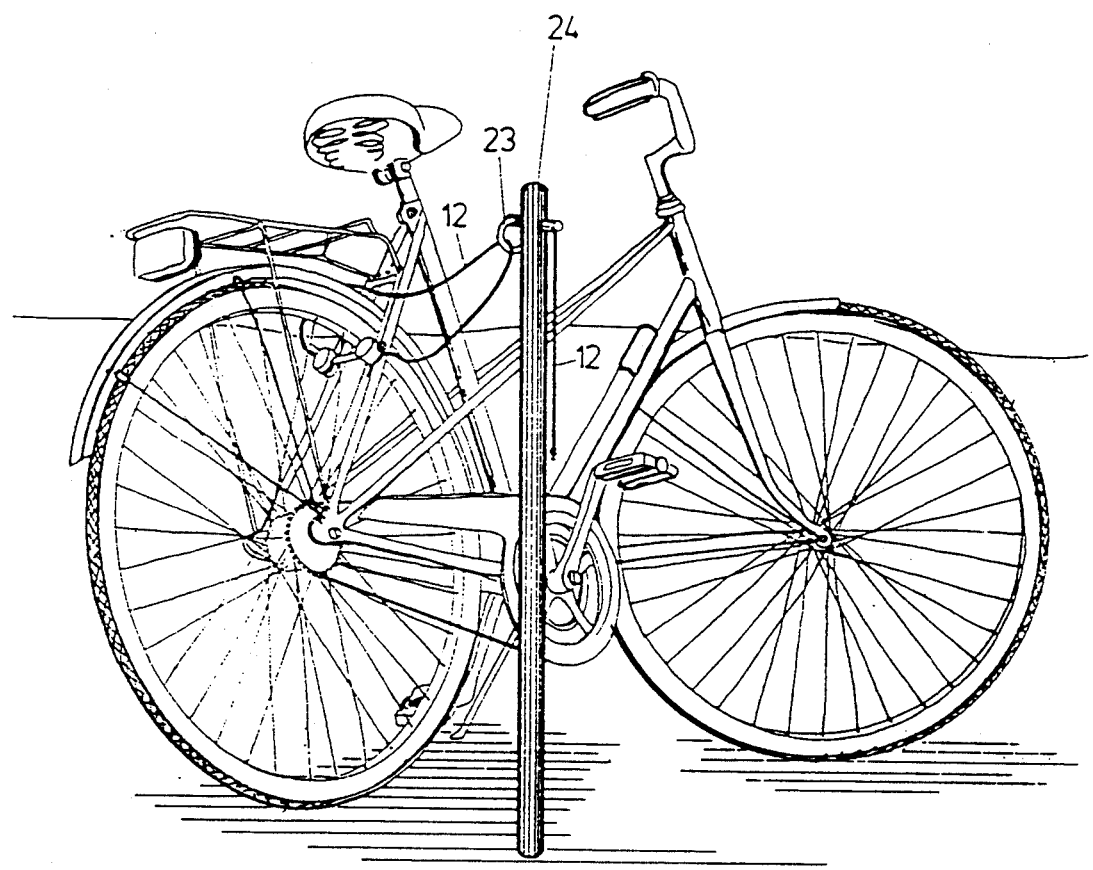

The lock according to the invention will now be described in more detail with reference to the drawing, where:

FIG. 1 shows a lock according to the invention with locking ring and cable-lock with common locking element, seen from the front and with a part-section seen in the direction I—I in FIG. 3, FIG. 2 shows a section through this lock before the securing, seen in the direction II—II in FIG. 1, FIG. 3 shows a section through the lock in the secured position, seen in the direction III—III, FIG. 4 shows a chain-lock according to the invention with locking ring and cable-lock seen from the front and partly in section, FIG. 5 is a perspective drawing of a lock according to the invention with locking arm and cable-lock with common locking elements, FIG. 6 is a perspective drawing of an embodiment of a lock according to the invention with locking arm and cable-lock with separate locking elements, and FIG. 7 shows the use of the lock according to the invention in connection with a bicycle and a fixed post.

In FIGS. 1-3 is shown an example of an embodiment of a ring-lock with a combination lock and provided with an integrated cable-lock.

The main lock itself comprises a lock housing 1 with a keyboard 2 and a retaining part 9 in which a locking ring 6 can slide towards and away from an engagement part 8. The locking ring 6 has a locking track 10 in the form of a recess or groove.

In order to strengthen the lock, there is also built in a steel hoop 5, which extends on the back of the housing and into the engagement and retaining parts 8, 9.

From the one side of the housing, there extends a cable 12 which is securely fastened to the housing 1 or means 13 attached thereto.

The cable 12 has a suitable diameter of, for example, 8 or 9 mm, and can be coated with clear plastic. The length can be, for example, 50 cm or more depending on requirements.

At the opposite end of the cable there is secured a locking piece 14 with a locking groove 15 in the form of a notch or recess.

This locking piece 14 can be inserted into a locking track 21 in the side of the housing.

The housing 1 has built-in locking elements in the form of a plate-formed pawl 4, which is suspended in an upper axle 3 so that it can move from an unlocked position as shown in FIG. 2, where the pawl 4 is free of engagement with both the groove 15 in the locking piece 14 and also the groove 10 in the locking ring 6.

When the lock is to be activated, the locking ring 6 is moved downward to its locking position with engagement part 8. The panel 4 is now free to swing down. Preferably, the panel 4 is spring loaded. The pawl 4 engages with the groove 10. Hereafter, the locking piece 14 inserted in the locking track 21 is secured by the pawl 4 which engages with the locking groove 15 as shown in FIG. 3. Thus, the wire lock 12,14 cannot be used alone, but used only when the main lock 6 is locked.

In FIG. 4 is shown an example of an embodiment in which the locking elements are a combination lock.

The combination is set by means of knobs 25 placed externally on the front of the housing 1. Each knob 25 is connected to a disk 26 inside the housing, said disks being provided with a notch 27 in their periphery.

When the combination lock is set for opening, all of the notches 27 point upwards as shown in FIG. 4.

Opposite each of the disks 26 there is mounted a pin 28 which is pressed by means of a spring 29 towards the periphery of the disk 26. On the drawing the lock is shown in the unlocked position. In this position, a transverse release arm 35 can be pressed in with a finger from outside against the pressure of a spring 36 at the end of the arm, in that the lowered position of the pins 28 releases a not shown blocking of the movability of the arm 35. In other words, the arm 35 can only be pressed in when the lock is correctly coded for unlocking. On the arm 35 there are mounted a number of wedge elements 34 which are able to lift associated locking pawls, as will be explained in the following.

In the embodiment of FIG. 4, the locking ring 6 has two locking grooves 10 for the locking pawls 30. These pawls 30 are also pressed down by means of a spring 29.

The pawls 30 are provided with a recess against which a wedge element 34 can lie, and as shown lift the pawls 30 free of the locking grooves 10 when the arm 35 is pressed in towards the left of the drawing.

The outer pawl 30 is further provided with a dog 37 which is in engagement with a rocker-pawl 31 which can pivot around an axle 32 in the housing 1. The end of this pawl forms a locking pawl 33 which can engage with the locking groove 15 in the locking piece 14. Here also, as can be seen, the wire lock 12,14 is locked only when the main lock 6 is locked.

As mentioned, in the position shown the lock is coded for opening, and will upon the pressing-in of the arm 35 lift the two locking pawls 30 free of the locking grooves 10 in the ring 6, whereupon by means of a spring this will be moved out of the engaging part 8 and into the retaining part 9. At the same time the locking pawl 31 will be moved upwards by the locking pawl 30 swinging free of the locking part groove 15 of the wire lock, upon which the locking piece 14 can be withdrawn.

When locking, it should be noted that a precondition for the locking of the locking piece 14 is that the ring-lock is in the locked position, whereby it is ensured that the ring-lock as well as the cable-lock are always locked.

In the embodiment of FIG. 4, the pawl is operated by a combination lock, but it lies within the scope of the invention to allow the pawl's movement to be controlled by other systems. Similarly, the pawl can have another suspension and appearance, depending on the lock system selected.

In FIG. 5 is shown an embodiment of the lock according to the invention comprising a lock with locking arm 17 which is housed in a retaining part 18, and where the arm 17 can pivot upwards and be secured in an engaging part 19 with locking element 20, which in the example shown is a key lock.

In the engaging part 19 there is a locking aperture 21 in which the locking piece 14 can be inserted and secured by means of locking elements.

In FIG. 6 is shown a further embodiment comprising a corresponding lock, but with a separate locking element 22 for the locking piece 14. This embodiment requires two inter-connectable locking elements, but it will provide extra security that two locking elements must be broken in order for the bicycle to be released.

Finally, in FIG. 7 there is shown an example of the use of the lock according to the invention. A bicycle equipped with a lock according to the invention can, by means of the cable 12 being led through an eye 23 on a post 24 or a similar object, be secured safely when the cable is inserted into the lock. If a rolled-up cable is used, this will be able to lie reeled up in the form of a coil under the saddle, and not take up room when the bicycle is being used.

It also lies within the scope of the invention to use a cable or a chain 12 which can be secured to a fixed object in the immediate vicinity of the bicycle, for example the post 24, as shown in FIG. 7. The bicycle can hereby be locked securely by inserting the free end 14 of the cable or the chain into the locking aperture 21 in the lock on the bicycle.

I claim:

1. Device for the dual locking of a spoked wheel in a dual leg fork of a vehicle comprising:
   a lock housing mounted to said fork, a main locking means in the form of a ring housed in said housing movable between a releasing position and a ring blocking position around spokes of the wheel,
   a locking element engaging part on said ring,
   a locking element in said housing to be secured to said locking element engaging part of the ring,
   a supplemental lock comprising a flexible member having one end attached to said housing and a locking piece on the other end to be introduced into said housing and secured by said locking element, and
   means for operating said locking element to secure the flexible member locking piece only upon the ring locking element also being secured by said locking element with the ring in its blocking position.

2. Locking device according to claim 1, wherein the locking element engaging part of the ring and the supplemental lock locking piece each comprises a locking groove, said locking element comprising a pawl to be moved into engagement with the locking groove in the flexible member locking piece when the pawl is opposite the locking groove of the ring.

3. Locking device according to claim 2, wherein said operating means comprises a hinged further pawl suspended in the lock housing, direct displacement of the pawl into and out of the locking groove of the ring swings the further pawl into and out of the locking groove in the locking piece.

* * * * *